Dec. 2, 1969     W. R. LESSIG III     3,481,123
HANDLE MOUNT FOR LAWN MOWER
Filed April 10, 1967     2 Sheets-Sheet 2
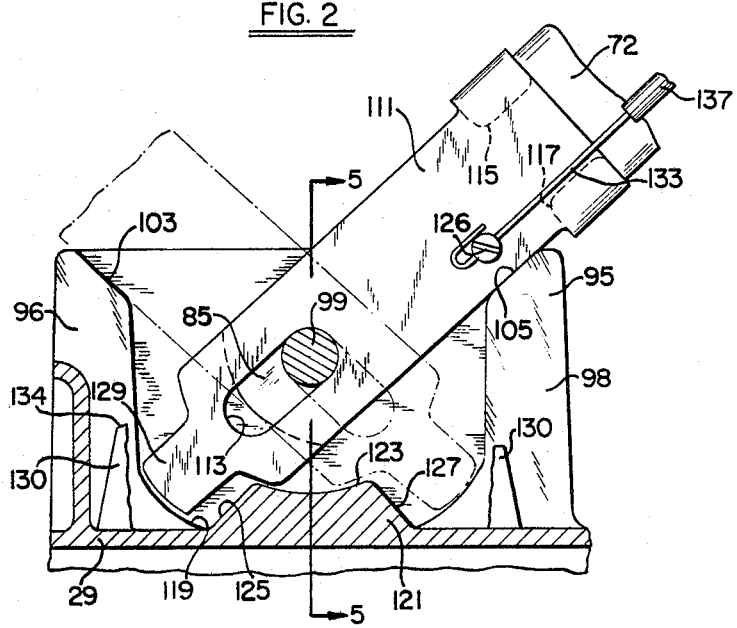
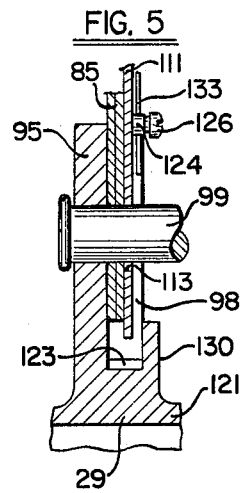
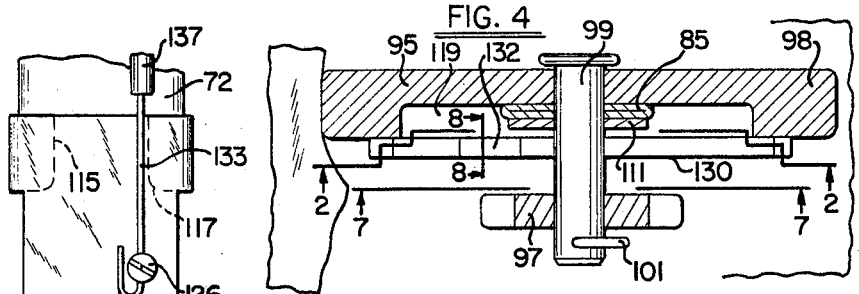
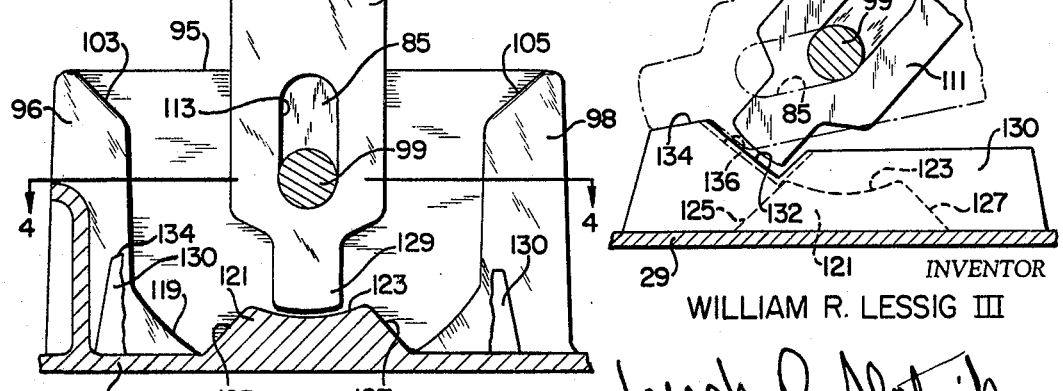
INVENTOR
WILLIAM R. LESSIG III
BY Joseph R. Slotnik
ATTORNEY United States Patent Office 3,481,123
Patented Dec. 2, 1969

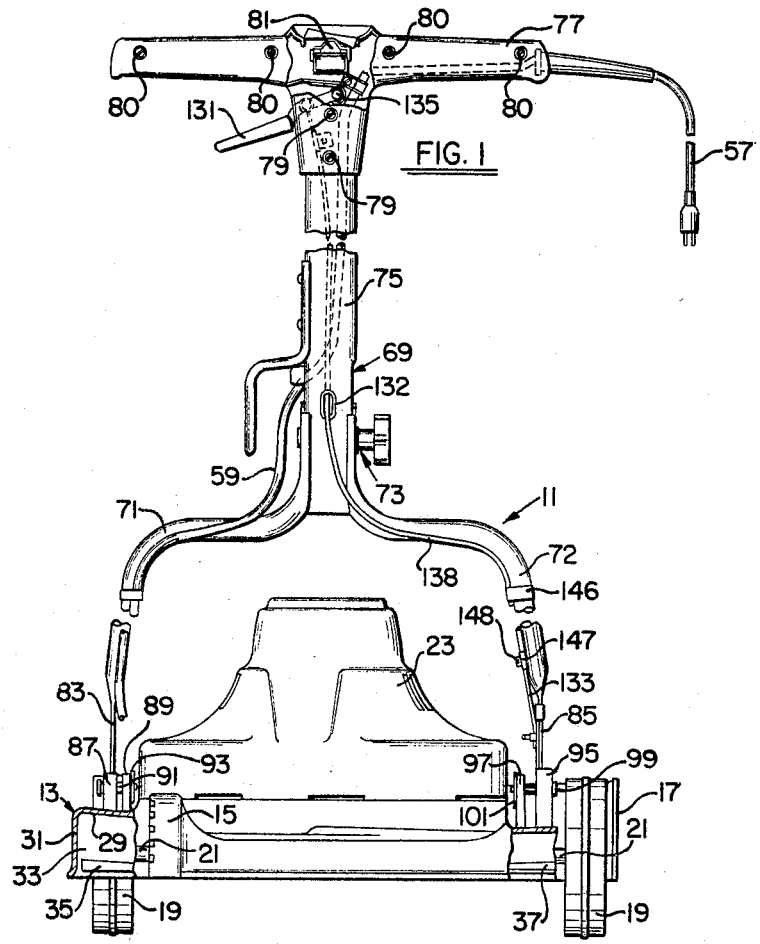
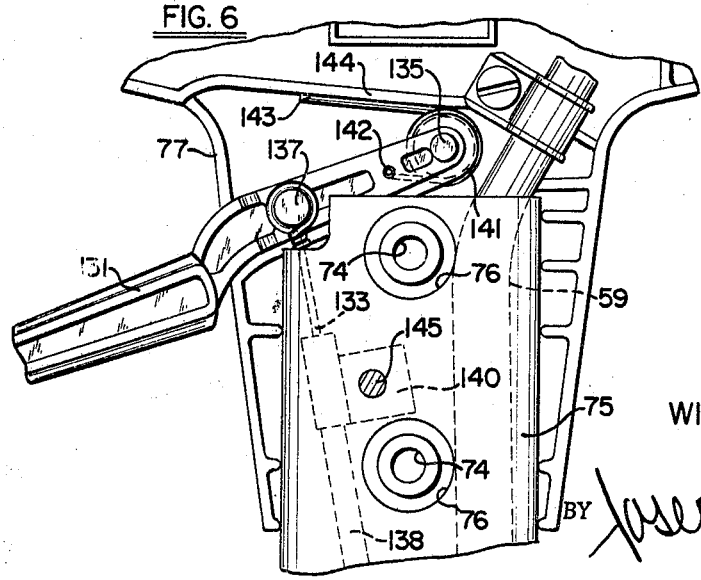
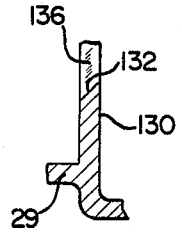

3,481,123
HANDLE MOUNT FOR LAWN MOWER
William R. Lessig III, Baltimore, Md., assignor to The Black and Decker Manufacturing Company, Towson, Md., a corporation of Maryland
Filed Apr. 10, 1967, Ser. No. 629,727
Int. Cl. A01d 35/24
U.S. Cl. 56—25.4                               18 Claims

ABSTRACT OF THE DISCLOSURE

The device hereinafter disclosed relates to a lawn mower of the type having a housing supported for movement along the ground by a plurality of wheels and motivated and controlled by an upstanding handle pivotally secured to the housing. One or more rotary blades are supported on the housing and are driven by an electric motor supported atop the housing and powered from a remote electric source.

BRIEF SUMMARY OF THE INVENTION

The present invention relates to a releasable latch construction for lawn mower handles which can be pivotally reversed or flipped over on the mower so that the latter can be pushed in both a forward and a reverse direction. The latch includes a movable portion carried upon the handle and cooperable with means formed on the housing to retain the handle in spaced pivotal positions relative to the housing. The construction includes a minimum of separate parts and advantageously lends itself to the fromed means on the housing being integrated with the housing, and particularly being formed on handle mounting lugs which can be integrally cast with the housing. The latch prevents unintended or accidental handle flipover or reversing during use but is controllably releasable by the operator from his usual vantage point to permit pivoted reversal of the handle when it is desired to push the mower in the opposite direction. If desired, the handle can be swung to a generally horizontal position for convenient mower storage. Furthermore, the latch release mechanism is located to one side of the mower opposite a grass discharge opening in the housing so that the operator tends to walk around the mower side opposite the discharge opening when the handle is reversed.

An important object of the present invention, therefore, is to provide an improved operating and control handle for lawn mowers and the like which is controllably reversible on the mower for mower movement in either longitudinal direction.

Another important object of the present invention is to provide an improved handle construction of the above character which includes handle latch means requiring positive operation to facilitate handle reversal.

Still other important objects of the present invention are to provide an improved handle and latch construction of the above character for use with a lawn mower having a deck housing, wherein the handle is pivoted to lug means on the housing, and the latch means includes handle carried means on the lug means, and wherein the lug means may be easily and inexpensively cast integral with the housing.

Still other important objects of the present invention are to provide an improved handle latch construction of the above character which employs a minimum of separate parts, which is easily actuated and controlled by the operator from his usual vantage point and which presents an overall neat and aesthetically pleasing appearance.

Further objects of the present invention include the provision of an improved handle and latch construction of the above character which is relatively inexpensive to manufacture, rugged in construction and safe and reliable in use.

Other objects and advantages of the present invention will become more apparent from a consideration of the detailed description to follow taken in conjunction with the appended drawings.

BRIEF DESCRIPTION OF THE DRAWINGS

FIG. 1 is an elevational view, partly broken away, illustrating a lawn mower embodying the present invention;

FIG. 2 is an enlarged sectional view of FIG. 1 taken along the line 2—2 thereof and showing the handle and latch in position for normal mower operation;

FIG. 3 is a view similar to FIG. 2 showing the parts in an intermediate, released position.

FIG. 4 is a sectional view of FIG. 3 taken along the line 4—4 thereof;

FIG. 5 is a sectional view of FIG. 2 taken along the line 5—5 thereof;

FIG. 6 is an enlarged view illustrating the latch control mechanism shown in FIG. 1;

FIG. 7 is a sectional view of FIG. 4 taken along the line 7—7 thereof; and

FIG. 8 is an enlarged sectional view of FIG. 7 taken along the line 8—8 thereof.

BROAD STATEMENT OF THE INVENTION

Broadly described, the present invention relates to a mobile lawn and garden device of the type having a housing supported for movement longitudinally over the ground, blade means supported on said housing, and handle means pivotally secured at one end to said housing and extending upwardly therefrom and having handle grip means adjacent its other end adapted to be grasped by an operator for control and manipulation of said device; that improvement, in said device, which comprises latch means including a movable member supported on said handle means adjacent said one end, means on said housing defining a first and second recess forming a support for said handle in first and second operative positions, respectively, a cam surface separating said first and second recess, said movable latch member being normally positioned to be selectively receivable in said recesses to locate and retain said handle means in first and second substantially opposite, upwardly inclined operative positions relative to said housing, said cam surface being normally engageable with and adapted to guide said movable latch member from one recess to the other during pivotal movement of said handle means from said first to said second operative position, manual means on said handle means for releasing said movable latch member from said recesses, whereby pivotal movement of said handle means from said first operative position to said second operative position is effected by actuation of said manual means to release said movable latch member from one of said recesses, whereupon pivotal movement of said handle means on said housing is accompanied by smooth engagement between said movable latch member and said cam surface and movement of said latch member into the other recess when said handle reaches said second position.

In another aspect, the invention relates to a lawn mower having a mobile deck housing, a motor on said housing, blade means supported by said housing and driven by said motor, and a control handle, means interconnecting said handle and housing comprising lug means integral with said housing, said lug means defining first and second recess forming a support for said handle in first and second operative position, respectively, a cam surface separating said first and second recess, said handle having a lower terminal end pivoted to said lug means, said handle terminal end including latch means positionable selectively in said recesses to locate and retain said handle in first and second, oppositely disposed, upwardly inclined operative positions relative to said deck housing, means for withdrawing said latch means from either of said recesses whereby said handle can be pivoted from said first operative position to said second position, said cam surface engaging said latch means during pivotal movement of said handle from said first to said second operative position, whereby to smoothly guide said latch means from one recess to the other.

DETAILED DESCRIPTION

Referring now more specifically to the drawings, a wheel supported, electric lawn mower, which is one type of lawn and garden device in which the present invention is particularly useful, is illustrated in FIG. 1. However, it is to be understood that this invention is not so restricted in application, and may be employed in other types of lawn and garden devices, including both gas and electric powered as well as wheel and air supported devices.

With this in mind, the mower 11 is seen to include a deck housing 13, preferably of cast, lightweight aluminum or other suitable sturdy material, having four wheel supporting feet 15 integral therewith. A set of four ground engaging wheels 19 are journaled upon stub shafts 21 either fixed to or otherwise suitably supported by the feet 15. An electric motor (not shown) is supported upon and fixed to the housing 13 and is covered and protected by a plastic, insulating shroud 23. The deck housing 13 has a top 29 and a dependent peripheral skirt 31 which together define a blade cavity 33. A pair of rotary cutting blades 35, 37 are supported on the housing 13 within the cavity 33 and are driven by the motor (not shown) through a suitable transmission (not shown). The electric motor is powered from a remote electrical source connected thereto by a line cord 57 and a motor cable 59. A control and manipulating handle 69 is secured to the housing 13 and supports the cord 57 and cable 59 so that when the electric motor (not shown) is energized and the mower 11 moved over the ground, the blades 35, 37 rotate and perform the desired grass cutting operation. A discharge opening 17 is formed in one side of the skirt 31 for discharge of grass cuttings from the cavity 33.

The handle 69 includes a pair of generally S-shaped arms 71, 72 which form a lower handle portion and which are secured at one end by a clamp 73 to a hollow handle post 75. The upper end of the handle post 75 has handle grips 77 secured together and to the post by bolts 79 which extend through openings 74, 76 in the grips 77 and post 75, respectively, and are held in place by nuts (not shown). Other bolts 78 and nuts (not shown) extend through and hold the upper portion of the grips 77 together. The line cord 57 depends from the handle grips 77 and is connected to a control switch 81 and both the line cord and the switch are connected to the motor cable 59 in the usual fashion so that the control switch 81 facilitates easy on-off control of the motor.

According to the present invention, the handle 69 is pivotally interconnected with the deck housing 13 by a novel construction which facilitates handle "flip-over" or reversal at the end of each mower run quickly and easily but in a controlled, deliberate fashion so as to eliminate the possibility of inadvertent or accidental handle reversal during a normal run which might result in injury to the operator. Thus, the handle arms 71, 72 have lower terminal ends 83, 85, respectively, which are pivotally connected to the mower housing 13. As seen in FIG. 1, the terminal end 83 of the arm 71 is disposed between spaced upstanding lugs 87, 89 formed integral with the housing 13 and is pivoted thereto by a pivot pin 91 held in place by a clip 93. Likewise, the terminal end 85 and the arm 72 is disposed between the pivotal to spaced upstanding lugs 95, 97 by a pivot pin 99 held in place by a clip 101. Each of the lugs 87, 95 is generally channel shaped in cross-section having spaced legs 96, 98 which terminate in upwardly facing, diverging stop surfaces 103, 105, (shown only for lug 95 in FIGS. 2 and 3). The handle arms 71, 72 are sprung when in position so that the terminal ends 83, 85 are betwen the legs 96, 98 of the respective lugs 87, 95 and the stop surfaces 103, 105 will engage the arm terminal ends 83, 85 to define the limits of pivotal movement of the handle 69.

In practice, an included angle of about 90° between the surfaces 103, 105 and an inclination relative to the horizontal of about 45° for each of the surfaces 103, 105 has been found to provide optimum handle positioning for comfortable mower manipulation and control. However, these angles are given by way of illustration only and may vary somewhat according to particular desires.

In order to provide for controlled handle reversing and to prevent inadvertent or accidental handle "flip-over" during the process of a normal mowing run, the handle terminal end 85 is provided with a latch adapted to releasably cooperate with abutment surface means on or adjacent the lug 95 to hold the handle 69 in selected pivoted positions relative to the deck housing 13. The latch construction and abutment surface configuration is such that it insures retention of the handle 69 in the desired position and requires positive and deliberate actuation to effect release thereof. Desirably, a minimum of controlled effort is needed to effect latch release.

Thus, as seen in FIGS. 2–5, a latch body 111 has a pair of return bent tabs 115, 117 at its upper end which slidably embrace the handle terminal end 85, and is provided with an elongated opening 113 toward its lower end pivotally and slidably receiving the pivot pin 97 so that the latch body 111 pivots with the handle end 85 and is slidable longitudinally relative thereto. The channel shaped lug 95 receives the handle terminal end 85 together with the latch body 111 and the channel terminals at its lower end in a concave, arcuate surface 119, the center of curvature of which lies substantially at the center of the pivot pin 99. At the middle of the surface 119 there is formed an upwardly facing boss 121 having a concave, generally arcuate cam surface 123 with substantially the same center of curvature as the surface 119. A pair of arcuately spaced, generally radially extending surfaces 125, 127 interconnect the arcuate surface 119 and the arcuate surface 123 at either side of the latter.

The lower end of the latch body 111 has a longitudinally projecting finger 129 integral therewith. The latch body 111 is free to slide relative to the handle terminal end 85 to the extent allowed by the elongated slot 113 so that in the lower limit of movement, shown in FIG. 2, the finger 129 substantially reaches the arcuate surface 119. In the upper limit of movement of the latch body 111, shown in FIG. 3, the finger 129 is spaced somewhat from the arcuate surface 119 and will clear the radial surfaces 125, 127, being spaced slightly from the arcuate surface 123. In the former poistion, the finger 129 will interferingly engage either the radial surface 125 or the surface 127, depending upon the pivoted position of the handle 69 at the time. These radial surfaces 125, 127 therefor form abutment surfaces which cooperate with the latch finger 129 to retain the handle 69 in either one of two pivoted positions, one at either end of the pivotal movement thereof allowed by the tapered surfaces 103, 105 on the upper ends of the lugs 87, 95. However, when the latch body 111 is moved to the upper limit of its travel, as seen in FIG. 3, the finger 129 will pass free of the abutment surfaces 125, 127 and the handle 69 can be swung to the other pivotal position relative to the desk housing 13. The arcuate configuration of the surface 123 cooperates with the finger 129 in a manner such that if the latch body 111 is released after pivotal movement of the handle 69 has begun, the latch body will remain substantially in the upper limit of its travel relative to the handle end 85 until the finger 129 has moved past the surface 123. If desired, an upstanding abutment wall 130 may be formed on the deck housing top 29 intermediate the lugs 95, 97 to retain the lower portion of the latch body 111 in close proximity to the handle terminal end 85.

In order to controllably manipulate the latch body 111, a control lever 131 is pivotally secured between the handle grips 77 and is connected to the latch body 111 by an elongated, control cable 133 (FIG. 6). The control lever 131 has an integral, pin-like projection 135 pivotally supported by the grips 77 and another pin-like projection 137 over which one end of the control cable 133 is looped. The cable 133 extends through the hollow handle post 75 and exists the latter through a bushing 132 near its lower end and the other end of the cable 133 extends through a wire stop 124 on the latch body 111 and is fixed thereto by a screw 126 (see FIGS. 2, 3 and 5). A major portion of the cable 133 is covered and protected by a sheath 138 which slidably receives the cable and is fixed to the handle post 75 by a tab 140 formed integral therewith and held in place on the post by a pin 145 spanning the handle post 75. The sheath 138 is also fixed to the handle arm 72 by a clip 146 and a tab 147, the latter being held in place by a screw 148. A torsion spring 141 surrounds the pivot pin 135 and has one tang 142 extending through the lever 131 and another tang 143 adapted to engage an abutment 144 on the grips 77. The spring 141 normally biases the control lever 131 in a downward direction about the pivot 135 and this in turn exerts a downward force on the cable 133 and therefore on the latch body 111. Thus, when the handle 69 is positioned at either terminal pivoted position relative to the deck housing 13, the latch finger 129 is biased toward the surface 119 under the force of the spring 141 and by interfering engagement with either of the surfaces 125, 127 prevents the handle 69 from being inadvertently or accidentally reversed or flipped over.

When it is desired to flip or reverse the handle 69, the operator pulls upwardly on the lever 131 against the action of the spring 141. This raises the cable 133 and the latch body 111 so that the handle 69 is now free to pivot about the pivots 91, 99. Once this pivot action of the handle 69 has begun, the operator can release the lever 131, and during continued handle pivotal movement, the latch finger 129 rides on the surface 123 until it moves past this surface at which time the spring 141 returns the lever 131, the cable 133 and the latch body 111 downwardly. The handle 69 is now locked and ready for use.

For storage purposes, it is desirable that the mower 11 "hang flat" or, in other words, that the mower handle 69 be capable of being positioned generally parallel to the deck housing top 29 so that the mower 11 will hang close to a wall or will store under a table, bench or the like. To achieve this, the handle arms 71, 72 are squeezed toward each other to move the handle arm terminal ends 83, 85 and the latch body 111 clear of the legs 96, 98 and the stop surfaces 103, 105 on the lugs 87, 95. The lugs 89, 97 are spaced sufficiently from the lugs 87, 95, respectively, to allow this so that when the parts are so positioned, the handle 69 is free to pivot beyond the limits defined by the stop surfaces 103, 105 (see FIG. 2). If the abutment wall 130 is provided adjacent the lug 95, as shown in FIGS. 5–7, this wall 130 is notched as shown at 132. This notch 132 aligns with the latch finger 129 when the handle arm 72 is in the position shown in full lines in FIG. 2 and the latch body 111 is raised by lifting up on the lever 131, as shown in FIG. 7, so that when the parts are in this position, the latch finger 129 can move past the abutment wall 130 upon squeezing the handle arms 71, 72 together.

In any event, when the handle arms 71, 72 are squeezed toward each other, the handle 69 can be pivoted to move the handle arm terminal portions 83, 85 along the inner surface of the legs 98 of the lugs 87, 95, respectively, as shown in dot-dash lines in FIG. 7. Frictional engagement between the handle arm terminal portions 83, 85 and the legs 98 on the lugs 87, 95, respectively (as a result of the normal tendency of the handle arms 71, 72 to spring outwardly against the lugs 87, 95), will normally hold the handle 69 in this lowered or "hang flat" position. Alternatively, the latch finger 129 can cooperate with a top surface 134 on the abutment wall 130, or the latch body 111 or one or both of the handle arm terminal ends 83, 85 may have detent or stop means thereon (not shown) cooperable with means (not shown) on one or both of the lugs 87, 95 to retain the handle 69 in this position.

When it is desired to reposition the handle 69 for normal operation, the lever 131 is raised to lift the finger 129 clear of the surface 134 and the handle 69 is pivoted to a position where the handle arm terminal ends 83, 85 are clear of the legs 98 of the lugs 87, 95 and the latch finger 129 aligns with the notch 132 (FIG. 7). In this position, the spring force of the handle arms 71, 72 takes over to reposition the handle arm terminal ends 83, 85 within the channeled lugs 87, 95, respectively.

In order to prevent the latch finger 129 from inadvertently moving through or becoming hung up in the slot 132 during normal mower operation, the edge of the slot 132 may be tapered as at 136 in a direction toward the lug 95 (see FIG. 8). This edge 136 will cooperate with the finger 129 and cam the latter back into place between the abutment wall 130 and the lug 95 upon pivoting the handle 69.

It will be appreciated that lugs 87, 89 and 95, 97 together with the boss 121 and the wall 130 may be integrally cast with the deck housing 13. In this respect, it will be noted that all surfaces on the lugs, boss and wall face upwardly so that the dies used require no side pulls which helps to minimize the manufacturing costs thereof. In addition, apart from the latch body 111 and teh cable 133, the handle latch components are integral parts of the mower 11 and this further contributes to low manufacturing and maintenance costs, and also adds to the overall appearance of the mower 11 making it neat and aesthetically pleasing.

In addition, the lever 131 is on the opposite side of the mower 11 from the discharge opening 17 and the line cord 57. Thus, when the handle 69 is flipped over at the end of a mower run, with the motor and blades 35, 37 still in operation, the operator will be compelled to walk around the side of the mower opposite the discharge 17 and consequently will not be in danger of being struck by flying objects emitted therefrom.

By the foregoing, there has been disclosed an improved handle and latch construction for lawn mowers and the like calculated to fulfill the inventive objects hereinabove set forth, and while a preferred embodiment of the present invention has been illustrated an described in detail, various additions, substitutions, modifications and omissions may be made thereto without departing from the spirit of the invention as encompassed by the appended claims.

I claim:

1. In a mobile lawn and garden device of the type having a housing supported for movement longitudinally over the ground, blade means supported on said housing, and handle means pivotally secured at one end to said housing and extending upwardly therefrom and having handle grip means adjacent its other end adapted to be grasped by an operator for control and manipulation of said device; that improvement, in said device, which comprises latch means including a movable member supported on said handle means adjacent said one end, means on said housing defining a first and second recess forming a support for said handle in first and second operative positions, respectively, a cam surface separating said first and second recess, said movable latch member being normally positioned to be. Selectively receivable in said recesses to locate and retain said handle means in first and second substantially opposite, upwardly inclined operative positions relative to said housing, said cam surface being normally engageable with and adapted to guide said movable latch member from one recess to the other during pivotal movement of said handle means from said first to said second operative position, manual means on said handle means for releasing said movable latch member from said recesses, whereby pivotal movement of said handle means from said first operative position to said second operative position is effected by actuation of said manual means to release said movable latch member from one of said recesses, whereupon pivotal movement of said handle means on said housing is accompanied by smooth engagement between said movable latch member and said cam surface and movement of said latch member into the other recess when said handle reaches said second operative position.

2. A construction as defined in claim 1 wherein said movable latch member is movable from a first position to be received in said recesses, to a second position where it is spaced from said recesses, and spring means normally biasing said latch member toward said first position.

3. A construction as defined in claim 1 wherein said manual means includes control means on said handle means adjacent said handle grip means.

4. A construction as defined in claim 1 wherein said means defining said recesses includes abutment means cooperable with said handle means and preventing movement of said handle means beyond said first and second positions.

5. A construction as defined in claim 1 wherein said housing has a pair of laterally spaced, upstanding lugs rigid therewith, said handle means has a pair of laterally spaced, lower leg portions pivotally connected to a respective one of said lugs, said movable latch member and said recess defining means being carried by and formed by one interconnected set of said leg portions and lugs, respectively.

6. A construction as defined in claim 5 wherein said lug means include abutment means cooperable with said leg portions preventing movement of said handle means beyond said first and second positions.

7. A construction as defined in claim 5 wherein said set of lugs and leg portions are pivotally interconnected by a pin, said movable latch member including a body slidable along said handle portion of said interconnected set and having an elongated aperture pivotally and slidably receiving said pin.

8. A construction as defined in claim 6 wherein said lug of said interconnected set is generally channel shaped in cross-section, said leg portion of said interconnected set being disposed within said channel member, the upper end of said channel member defining two spaced abutment surfaces, said channel member having a laterally projecting portion adjacent its lower end, said recesses being formed in said laterally projecting portion.

9. A construction as defined in claim 8 wherein said handle portion of said interconnected set and said latch member are movable laterally to a position out of said channel member, whereby said handle means can pivot free of said abutment surfaces.

10. A construction as defined in claim 1 wherein said movable latch member includes a body overlaying a portion of said handle means and having return bent portions slidably embracing said handle means.

11. In a lawn mower having a mobile deck housing, a motor on said housing, blade means supported by said housing and driven by said motor, and a control handle, means interconnecting said handle and housing comprisig lug means integral with said housing, said lug means defining first and second recesses forming a support for said handle in first and second operative positions, respectively, a cam surface separating said first and second recess, said handle having a lower terminal end pivoted to said lug means, said handle terminal end including latch means positionable selectively in said recesses to locate and retain said handle in first and second, oppositely disposed, upwardly inclined operative positions relative to said deck housing, means for withdrawing said latch means from either of said recesses whereby said handle can be pivoted from said first operative position to said second operative position, said cam surface engaging said latch means during pivotal movement of said handle from said first to said second operative position, whereby to smoothly guide said latch means from one recess to the other.

12. A construction as defined in claim 11 wherein said lug means and said handle terminal end have cooperable stop surfaces preventing pivotal movement of said handle beyond said first and second positions.

13. A construction as defined in claim 11 wherein said lug means includes an upstanding generally channel shaped lug having spaced legs, said cam surface is formed on a boss integral with said housing and lug and between the legs of the latter, said recesses being formed between said boss and the legs of said channel shaped lug.

14. A construction as defined in claim 13 wherein the upper edges of said channel legs are engageable with the terminal end of said handle and form stop surfaces preventing pivotal movement of said handle beyond said first and second positions.

15. A construction as defined in claim 14 wherein said handle terminal portion includes laterally spaced terminal ends, said lug means including laterally spaced, channel shaped lugs receiving said terminal ends therein.

16. A construction as defined in claim 15 wherein said handle terminal ends are movable toward each other and out of said channel shaped lugs to a position where said handle can pivot free of said stop surfaces, said latch means including an elongated body slidable on one of said terminal ends, return bent tabs at one end of said body and slidably embracing said one terminal end, wall means rigid with one of said lugs and cooperating with the other end of said body to retain the latter in close proximity to said one terminal end, said wall means having a notch therein permitting lateral movement of said latch body when said terminal ends are moved toward each other.

17. A construction as defined in claim 11 wherein said latch means includes a latch body slidable on said handle terminal end and receivable selectively in said recesses, releasing means including a pivotal lever near the end of the handle remote from the terminal end, and means interconnecting said pivotal lever and said latch body.

18. A construction as defined in claim 17 which includes spring means normally biasing said lever in a direction to normally hold said latch body in a direction for reception in said recesses.

References Cited
UNITED STATES PATENTS

| | | | |
|---|---|---|---|
| 2,715,535 | 8/1955 | Prowinsky | 28—47.36 XR |
| 3,144,258 | 8/1964 | Ottosen et al. | 56—25.4 XR |
| 3,192,692 | 7/1965 | Slemmons | 56—25.4 |

FOREIGN PATENTS

| | | |
|---|---|---|
| 169,326 | 9/1921 | Great Britain. |

ANTONIO F. GUIDA, Primary Examiner

U.S. Cl. X.R.

116—112; 280—47.36